US012674693B2

(12) United States Patent
Förster

(10) Patent No.: US 12,674,693 B2
(45) Date of Patent: Jul. 7, 2026

(54) METHOD FOR OPERATING A MAGNETIC-INDUCTIVE FLOWMETER AND A CORRESPONDING MAGNETIC-INDUCTIVE FLOWMETER

(71) Applicant: KROHNE Messtechnik GmbH, Duisburg (DE)

(72) Inventor: Jan Förster, Essen (DE)

(73) Assignee: Krohne Messtechnik GmbH, Duisburg (DE)

( * ) Notice: Subject to any disclaimer, the term of this patent is extended or adjusted under 35 U.S.C. 154(b) by 279 days.

(21) Appl. No.: 18/430,899

(22) Filed: Feb. 2, 2024

(65) Prior Publication Data

US 2024/0263979 A1 Aug. 8, 2024

(30) Foreign Application Priority Data

Feb. 3, 2023 (DE) ...................... 10 2023 102 673.9

(51) Int. Cl.
G01F 1/60 (2006.01)
G01F 1/58 (2006.01)

(52) U.S. Cl.
CPC ............... G01F 1/60 (2013.01); G01F 1/588 (2013.01)

(58) Field of Classification Search
CPC ............... G01F 1/60; G01F 1/588; G01F 1/58
See application file for complete search history.

(56) References Cited

U.S. PATENT DOCUMENTS

| | | | |
|---|---|---|---|
| 6,615,149 B1 | 9/2003 | Wehrs | |
| 2008/0250867 A1 | 10/2008 | Schmalzried et al. | |
| 2009/0199655 A1* | 8/2009 | Budmiger ................. | G01F 1/60 |
| | | | 73/861.11 |
| 2011/0239778 A1 | 10/2011 | Mitsutake et al. | |
| 2017/0234708 A1 | 8/2017 | Xie | |
| 2018/0031400 A1 | 2/2018 | Tower, III et al. | |
| 2020/0080877 A1 | 3/2020 | Foss et al. | |
| 2022/0082417 A1* | 3/2022 | Förster ................... | G01F 25/10 |

FOREIGN PATENT DOCUMENTS

| | | |
|---|---|---|
| DE | 10 2007 015 368 A1 | 10/2008 |
| DE | 10 2021 208 598 A1 | 2/2023 |

* cited by examiner

*Primary Examiner* — Xin Y Zhong
(74) *Attorney, Agent, or Firm* — Muncy, Geissler, Olds & Lowe, P.C.

(57) ABSTRACT

A method for operating a magnetic-inductive flowmeter includes: generating polarized measurement data dependent on a polarity of a magnetic field passing through a measuring tube; obtaining a frequency spectrum independent of the magnetic field by a discrete frequency analysis of the polarized measurement data; obtaining a magnetic field-dependent frequency spectrum by a discrete frequency analysis of depolarized measurement data derived from the polarized measurement data; examining amplitude values of the magnetic field-independent frequency spectrum for a magnetic field-independent event, and/or examining amplitude values of the magnetic field-dependent frequency spectrum for a magnetic field-dependent event; and identifying and signaling the presence of a magnetic field-independent event and/or a magnetic field-dependent event. A related magnetic-inductive flowmeter is also disclosed.

14 Claims, 5 Drawing Sheets

METHOD FOR OPERATING A MAGNETIC-INDUCTIVE FLOWMETER AND A CORRESPONDING MAGNETIC-INDUCTIVE FLOWMETER

TECHNICAL FIELD

The invention relates to a method for operating a magnetic-inductive flowmeter with a measuring tube for guiding a medium, with a magnetic field generator for generating a magnetic field of alternating magnetic field polarity passing through the measuring tube perpendicular to the direction of flow of the medium, with a pair of electrodes for tapping an electrical measuring signal induced in the medium, wherein measurement data obtained from the measuring signal is transformed from a time domain into a frequency domain and the measuring signal is processed at least into a flow measurement value. Furthermore, the invention also relates to a magnetic-inductive flowmeter which further comprises a signal processing device which obtains measurement data from the measuring signal, which transforms the measurement data from a time domain into a frequency domain and wherein the signal processing device processes the measuring signal into a flow measurement value; the magnetic-inductive flowmeter thus performs the aforementioned method.

BACKGROUND

The aforementioned flowmeters, which are based on the magnetic-inductive measuring principle, have been known for decades. Consequently, methods for operating such flowmeters as described above have also been known for a long time. The magnetic-inductive measuring principle is based on the action of force on charge carriers that move perpendicular to a magnetic field or that have a component of movement perpendicular to the magnetic field in question (Lorentz force). In order to be able to perform a flow measurement based on this principle, the medium in the measuring tube must have a certain electrical conductivity. The faster the medium moves through the measuring tube and thus also through the magnetic field generated by the magnetic field generator, the stronger the separation of charge carriers in the flowing medium of the corresponding measuring tube section, and the stronger the electric field caused by the charge separation, which forms between the electrodes of the measuring tube and can be detected as an electric voltage between the electrodes. The induced voltage between the electrodes develops in proportion to the flow velocity, at least during the period in which the magnetic field is constant and the conductivity of the medium or the charge carrier concentration in the medium is constant.

Even if the basic relationships of the magnetic-inductive measuring principle are completely clear, there are still a few hurdles to overcome in measurement-based practice before a flowmeter is available that provides reliable and clear flow information. One of these hurdles is that the electrical voltage induced in the medium is presented as a distinctly noisy measuring signal at the electrodes of the electrode pair. The signal-to-noise ratio of this noisy measuring signal is usually so low that reliable and clear flow information cannot be obtained directly from the noisy measuring signal. This noise is caused, for example, by electrochemical processes at the electrodes.

In order to obtain a suitable flow measurement value from the measuring signal, the measuring signal is processed in a signal processing device, for example by high-impedance sampling of the measuring signal and by averaging a large number of measurement data obtained by sampling. This flow measurement value obtained in this way is then usually displayed.

To reduce the interference voltages caused by electrochemical processes, it is known from the state of the art to constantly change the direction of the magnetic field, i.e. the magnetic field polarity, so that the voltage induced in the medium also changes its direction. The interference voltages that are not dependent on the magnetic field and therefore do not change their sign with the magnetic field polarity can thus be averaged out. The change of the magnetic field is carried out with a determined alternating frequency. For this purpose, the direction of current flow to the coils in the magnetic field generator is changed regularly. As a result of the change in direction, the measuring signal and the measurement data obtained from the measuring signal are subject to modulation. In principle, the influence of the modulation leads to artifacts in the frequency spectrum when the measurement data is subjected to a frequency analysis.

SUMMARY

It is known from DE 10 2020 123 941 A1 to only use measurement data for the frequency analysis and the determination of flow information that originates from a time window in which the magnetic field is constant. The measurement data captured from time domains of a constant magnetic field do not show any modulation-related artifacts in the frequency spectrum. Furthermore, it is known from the disclosed invention to average several frequency spectra and thus achieve a better signal-to-noise ratio in the frequency range. The information from the frequency spectra can be used, for example, to check the validity of flow measurement values.

Since the information that can be obtained from the measurement data by frequency analysis has proved to be extremely useful, the object of the present invention is to improve the frequency analysis of the measurement data in order to obtain further information from the measurement data.

In the method described above for operating a magnetic-inductive flowmeter, the object derived above is initially and essentially achieved by generating from the measuring signal at least one measurement data set with polarized measurement data dependent on the magnetic field polarity from time domains of different magnetic field polarity and by obtaining at least one frequency spectrum independent of the magnetic field by means of a discrete frequency analysis of the measurement data set with polarized measurement data. Furthermore, at least one measurement data set with depolarized measurement data is derived from the measurement data set with polarized measurement data and at least one magnetic field-dependent frequency spectrum is obtained by a discrete frequency analysis of the measurement data set with depolarized measurement data.

Furthermore, according to the invention, it is provided that, in an evaluation step, the amplitude values of the magnetic field-independent frequency spectrum are examined for at least one magnetic field-independent event by peak detection and/or the amplitude values of the magnetic field-dependent frequency spectrum are examined for at least one magnetic field-dependent event. Finally, when a magnetic field-independent event and/or a magnetic field-dependent event is identified, the presence of the event is signaled.

In the magnetic-inductive flowmeter according to the invention, the method is implemented by the corresponding design of the signal processing device, which is then configured such that it captures or generates the measurement data sets in the operating state, performs the frequency analyses and carries out the peak detection described above, the identification of one or more events, and finally the signaling of existing events.

With the method according to the invention, it is possible in a clever way not only to recognize periodic events in the measuring signal per se, but also to distinguish whether they are magnetic field-dependent events or magnetic field-independent events. According to the invention, it has been recognized that events reflected in the measurement data can be divided into events that follow the magnetic field, i.e. are dependent on the magnetic field polarity, and events that are independent of the magnetic field, i.e. are independent of the magnetic field polarity. The present invention makes use of this dependence. In order that the dependence on the magnetic field polarity in the measurement data can be used at all, the measurement data require a certain treatment, so that, in the language of the present invention, polarized measurement data and depolarized measurement data are present.

The measurement data set with polarized measurement data comprises several measurement data obtained from the measuring signal, including from times of different magnetic field polarity. In the presence of a flow, which is assumed in the considerations made here, the measuring signal—and thus also the measurement data—changes sign, which is why polarized measurement data is used in this case. The measuring signal is usually dominated by the movement of the medium and the resulting voltage induced in the medium. However, the measuring signal can also contain a component that does not depend on the magnetic field polarity and therefore always enters the measuring signal and thus the measurement data with the same sign. If a frequency spectrum is now obtained by discrete frequency analysis on the basis of this measurement data set with polarized measurement data, then it is a frequency spectrum independent of the magnetic field, since the magnetic field-dependent contributions in the measurement data, as explained above, have a change of sign and their contributions are therefore attenuated in the evaluation. The contributions in the measuring signal that are independent of the magnetic field polarity have a constant sign in the measurement data set with polarized measurement data, which is why the contributions of the effects that are independent of the magnetic field polarity are retained and become more prominent.

One idea of the invention is to derive a measurement data set with depolarized measurement data from the measurement data set with the polarized measurement data, in which precisely the components in the measurement data that depend on the magnetic field polarity no longer exhibit this dependency, and the components in the measurement data that are independent of the magnetic field polarity now exhibit such a dependency. If a frequency spectrum is then obtained on the basis of this measurement data set with the depolarized measurement data by discrete frequency analysis, then this shows magnetic field-dependent effects and is, in this respect, a magnetic field-dependent frequency spectrum. The magnetic field-independent contributions in the measurement data have a change of sign, which is why their contributions are now strongly attenuated in the evaluation. The contributions in the measuring signal that are dependent on the magnetic field polarity have a constant sign in the measurement data set with depolarized measurement data, which is why the contributions of the effects that are dependent on the magnetic field polarity are retained and become more prominent.

The discrete frequency analyses are preferably implemented by Fast Fourier analyses of the measurement data.

A preferred design of the method is characterized in that for the derivation of the measurement data set with depolarized measurement data from the measurement data set with polarized measurement data, the measurement data of the measurement data set with polarized measurement data from times of a determined magnetic field polarity are multiplied by −1. This operation eliminates the influence of the reversal of the magnetic field polarity on the measuring signal and thus on the measurement data, at least as far as the effects dependent on the magnetic field polarity are concerned. However, the components in the measurement data that are independent of the magnetic field polarity are now given a change of sign.

A further design of the method is characterized in that at least one constant component is calculated from the measurement data of the measurement data set with polarized measurement data and the constant component is subtracted from the measurement data of the measurement data set with polarized measurement data. In particular, a constant component is calculated for each contiguous time domain of a determined magnetic field polarity and the constant component is subtracted from the measurement data from exactly this contiguous time domain. Alternatively, a constant component can be calculated for several contiguous time domains of a determined magnetic field polarity and the constant component can be subtracted from the measurement data from exactly these contiguous time domains. By subtracting the constant component from the measurement data, only the alternating components of the information contained in the measurement data that are actually of interest remain, thus improving the signal-to-noise ratio. Subtracting the constant component for each contiguous time domain of a determined magnetic field polarity has the advantage over the alternative—determining the constant component over several contiguous ranges of a magnetic field polarity—of the more precise determination and subtraction of the constant component, especially in measurement situations with highly variable flow rates.

Preferably, both sets of measurement data are cleared of the constant component in order to benefit from an improved signal-to-noise ratio in both sets of measurement data. In this respect, a particularly preferred design of the method is characterized in that the measurement data set with depolarized measurement data is derived from the measurement data set with polarized measurement data after the constant component has been subtracted from the measurement data of the measurement data set with polarized measurement data, so that the measurement data set with polarized measurement data and the measurement data set with depolarized measurement data are both cleared of a constant component.

In an advantageous design of the method, a certain portion of measurement data is discarded or set to zero after the magnetic field polarity changes, or no measurement data is captured from the measuring signal for a determined period of time after the magnetic field polarity changes. In particular, the measurement data that falls within a time domain of a transient magnetic field curve is discarded, set to zero or not captured. The time domain of the transient magnetic field curve is generally considered to be ended when 95% of the final magnetic field strength is reached (three time constants for a first-order system, such as the present system of the magnetic field generator consisting of coil and ohmic resistor), preferably when 98% of the final magnetic field strength is reached. Since the magnetic field polarity cannot be changed instantaneously due to the inductances present, but rather there is always a transitional range in which the magnetic field builds up and decays, changes its polarity and finally returns to a stationary state, this ensures that only measurement data under the effect of a constant magnetic field is used, which is necessary in order to be able to obtain comparable measurement data from the measuring signal at all.

A further design of the method is characterized in that the number of measurement data in the measurement data set with polarized measurement data and thus the number of measurement data in the measurement data set with depolarized measurement data is determined from a desired spectral resolution of the magnetic field-dependent frequency spectrum and the magnetic field-independent frequency spectrum as well as the measurement signal sampling rate at which the measurement data is obtained from the measurement signal. For this purpose, the relationship that the spectral resolution of a discrete frequency analysis is equal to the quotient of the measuring signal sampling rate and the number of captured measurement data used for the calculation can be used. Preferably, care is taken to ensure that the measuring signal sampling rate and the alternating frequency at which the magnetic field polarity is changed are adapted to each other in such a way that the measuring signal sampling rate is an integer multiple of the alternating frequency of the magnetic field polarity. The use of integer multiples of the alternating frequency as the measuring signal sampling rate ensures that interference effects such as the leakage effect in the calculated frequency spectra are avoided.

Another preferred design of the method is characterized in that the measurement data set with polarized and/or depolarized measurement data is processed with a window function to force transitions between the measurement data from the initial range and the measurement data from the final range of a measurement data set on which the frequency analyses are based to be as free as possible of discontinuities. Jump points in the transitions of the measurement data sets lead to artifacts in the calculated frequency spectra, which can be significantly reduced by suitable windowing. The window function used is preferably a von Hanning window or a Blackman window.

A preferred further development of the method is characterized in that a magnetic field-independent event identified at an event frequency is subjected to a plausibility check in the magnetic field-independent frequency spectrum by checking whether identified or identifiable adjacent events exist that have a frequency difference from the event frequency of the identified magnetic field-independent event of twice the alternating frequency of the magnetic field polarity. This teaching is based on the understanding that the change in magnetic field polarity represents a modulation of the measuring signal and thus of the measured data. The portion of the measuring signal and thus of the measurement data that does not follow the magnetic field polarity is therefore modulated with a rectangular function that does not change sign. The frequency spectrum of this rectangular function has contributions in the amplitude spectrum at frequencies that correspond to even multiples of the alternating frequency of the magnetic field polarity changeover.

In the time domain, this modulation corresponds to a multiplication of the measurement data with the square wave function; in the frequency domain, this is a transformation of the frequency spectrum independent of the magnetic field with the frequency spectrum of the square wave function. As a result, the frequency spectrum of the rectangular function is found at the frequencies at which the magnetic field-independent frequency spectrum has an amplitude contribution. Since the amplitudes of the contributions in the frequency spectrum of the rectangular functions decrease sharply with higher frequencies, it is easiest to check for amplitude contributions at twice the frequency interval of the switching frequency of the magnetic field polarity. The amplitudes at higher even multiples of the switching frequency (4-fold, 6-fold, etc.) are often so small that they disappear in the noise of the frequency spectrum and are difficult to identify. Against the background described above, it is clear why the test for adjacent amplitude contributions at the specified frequency spacing represents a valid check for magnetic field-independent events. If these neighboring amplitudes cannot be identified, the detected event is not an event that does not follow the magnetic field. In particular, if a magnetic field-independent event is identified, it is checked whether the neighboring events are symmetrical to the event frequency of the magnetic field-independent event.

When it is mentioned that the system also checks whether identifiable neighboring events exist, this means that peak detection can be concentrated specifically on the frequency ranges in question, possibly with increased detection sensitivity.

If the plausibility test fails, then another event is present, but not a magnetic field-independent event, and the signaling of the event is adjusted accordingly.

The same procedure is used to identify magnetic field-dependent events. If a magnetic field-dependent event identified at an event frequency is present in the magnetic field-dependent frequency spectrum, the plausibility check checks whether identified or identifiable neighboring events exist which have a frequency difference from the event frequency of the identified magnetic field-dependent event to the simple alternating frequency of the magnetic field polarity, wherein in the case of an identified magnetic field-dependent event the neighboring events are symmetrical to the event frequency of the magnetic field-dependent event. The portion of the measuring signal and thus the measuring data that follows the magnetic field polarity is modulated with a square wave function with a change of sign. The frequency spectrum of this rectangular function has contributions in the amplitude spectrum at frequencies that correspond to odd multiples of the alternating frequency of the magnetic field polarity changeover. Here too, the amplitudes are greatest at the smallest frequency intervals, so that the search is based on amplitudes at a simple distance from the event frequency in the range of the switching frequency of the magnetic field polarity. The contributions at higher odd multiples of frequency intervals (3-fold, 5-fold) are often so small that they disappear in the noise of the frequency spectrum and are difficult to detect. In principle, however, such contributions could also be searched for.

One design of the method is characterized in that an averaged frequency spectrum is calculated by averaging several magnetic field-dependent frequency spectra and/or several magnetic field-independent frequency spectra and the averaged frequency spectrum is subtracted from the magnetic field-dependent frequency spectrum and/or from the magnetic field-independent frequency spectrum before performing the evaluation step. A baseline correction is performed by subtracting the averaged frequency spectrum from the magnetic field-dependent frequency spectrum and/ or from the magnetic field-independent frequency spectrum. Due to the subtraction, the resulting frequency spectrum has a better signal-to-noise ratio, which simplifies peak detection.

Another preferred design of the method is characterized in that in the evaluation step, amplitude values of identified events with an event frequency at a multiple of the alternating frequency of the magnetic field polarity are compared with window amplitude values of the frequency spectrum of the window function implemented by the change in magnetic field polarity. An identified event is discarded if its amplitude is smaller than a limit value dependent on the window amplitude value at the event frequency, in particular wherein the limit value is the window amplitude value itself. With this procedure, it can be ruled out that artifacts caused by the windowing are incorrectly identified as magnetic field-dependent or magnetic field-independent events of interest.

The method does not have to be performed in its entirety on the magnetic-inductive flowmeter in question. In particular, the measurement data can be sent to an external computing unit via an interface of the magnetic-inductive flowmeter and all further calculations can be carried out there. In particular, the current measurement data set can also be sent via a possible interface and the derivation of the measurement data set with depolarized measurement data as well as the calculation of the magnetic field-dependent and magnetic field-independent frequency spectra can be performed with an external computing unit.

All method steps of the evaluation step can also be performed externally to the magnetic-inductive flowmeter. The decisive factor is that information about the presence of a magnetic field-dependent event and/or a magnetic field-independent event is ultimately signaled by the magnetic-inductive flowmeter.

The derived object is also achieved in the magnetic-inductive flowmeter mentioned at the beginning, namely in that the signal processing device, in the operating state of the magnetic-inductive flowmeter, generates from the measuring signal at least one measuring data set with polarized measuring data dependent on the magnetic field polarity from time domains of different magnetic field polarity and in that the signal processing device obtains at least one frequency spectrum independent of the magnetic field by means of a discrete frequency analysis of the measuring data set with polarized measuring data.

The signal processing device also derives at least one measurement data set with depolarized measurement data from the measurement data set with polarized measurement data, wherein the signal processing device obtains at least one magnetic field-dependent frequency spectrum by means of a discrete frequency analysis of the measurement data set with depolarized measurement data.

Furthermore, in an evaluation step, the signal processing device examines the amplitude values of the magnetic field-independent frequency spectrum for at least one magnetic field-independent event and/or the amplitude values of the magnetic field-dependent frequency spectrum for at least one magnetic field-dependent event by peak detection. If the signal processing device identifies a magnetic field-independent and/or a magnetic field-dependent event, it signals the presence of an event.

One design of the magnetic-inductive flowmeter provides for a corresponding flag to be set in a memory of the signal processing device or a corresponding signal to be displayed on a display of the magnetic-inductive flowmeter or a corresponding message to be sent via a communication interface in order to signal the identified event.

BRIEF DESCRIPTION OF THE DRAWINGS

In detail, there are now a large number of possibilities for designing and further developing the method according to the invention for operating a magnetic-inductive flowmeter and the corresponding magnetic-inductive flowmeter. For this purpose, reference is made to the following description of embodiments in conjunction with the drawings.

DETAILED DESCRIPTION

The figures show, in different aspects, a method 1 for operating a magnetic-inductive flowmeter 2 and—quite schematically—also a corresponding flowmeter 2 which has a signal processing device 24 with the aid of which the method 1 shown in detail is actually performed.

Figure 1:
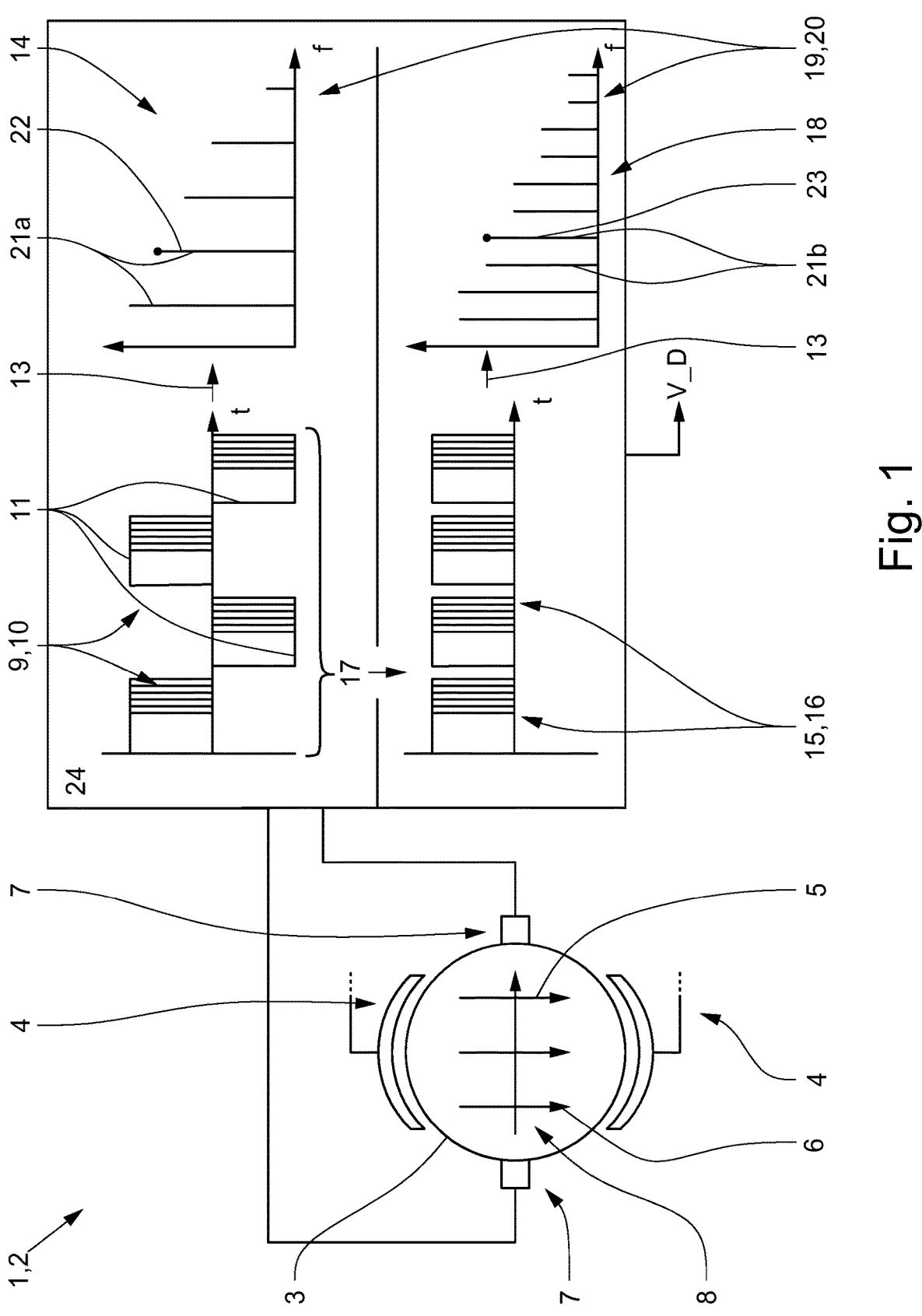
FIG. 1 schematically illustrates a magnetic-inductive flowmeter and a method for operating such a magnetic-inductive flowmeter.

FIG. 1 schematically shows that the flowmeter 2 has a measuring tube 3 for guiding a medium and a magnetic field generator 4 for generating a magnetic field 5 passing through the measuring tube 3 perpendicular to the direction of flow of the medium, wherein the magnetic field generator 4 is controlled in such a way that the magnetic field 5 has an alternating magnetic field polarity 6. The flowmeter 2 also has a pair of electrodes 7 for tapping an electrical voltage induced in the medium as a measuring signal 8. Measuring data 10 is obtained from the measuring signal 8, for example by sampling with an A/D converter. The measuring signal 8 or the measurement data 10 are processed to form a flow measurement value V_D, for example by averaging a plurality of measurement data.

It is also known to transform the measurement data 10 obtained from a time domain into a frequency domain and subject it to a frequency analysis. The frequency analysis of the measurement data can provide information about periodic events in the medium, provided that these have an effect on the measuring signal 8. In FIG. 1, this process is shown schematically in the upper diagram in the signal processing device 24. The diagram on the left, plotted over time t, shows the extraction of measuring data 10 from the measuring signal 8. The measuring signal also changes its sign when the magnetic polarity 6 changes, resulting in measuring signals 8 or measuring data 10 of different polarity, indicated by the blocks with the measuring data 10 pointing upwards and downwards. After changing the magnetic field polarity 6, it is usual to wait until the magnetic field 5 has reached a steady state before capturing further measurement data 10 in order to obtain measurement data 10 that actually only depends on the medium speed and is not variable due to the changing strength of the magnetic field 5.

Figure 2:
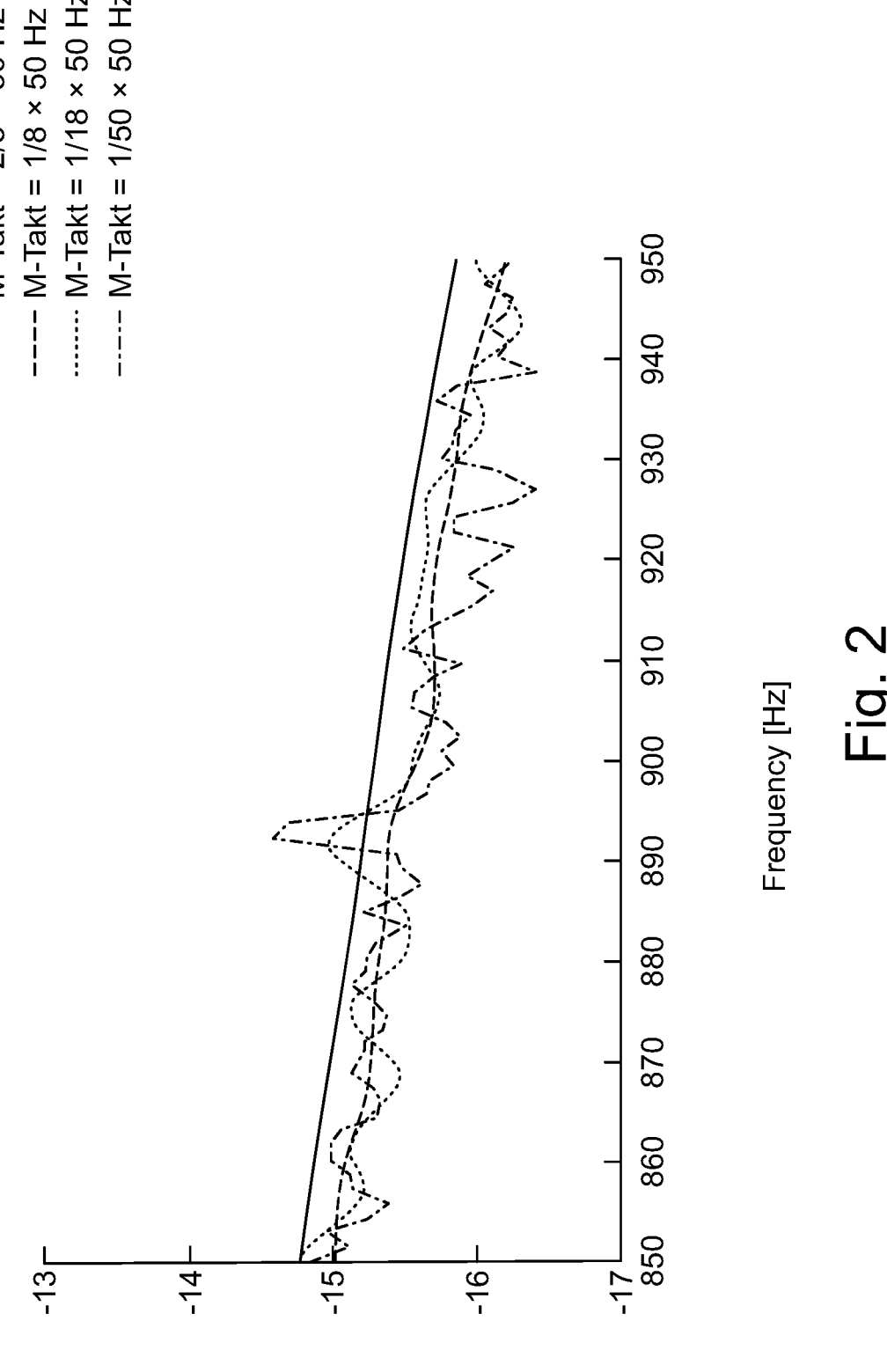
FIG. 2 illustrates the influence of different alternating frequencies on the frequency analysis with the same measurement data.

In any case, the illustration in FIG. 1 shows three switching processes that lead to a change in the magnetic field polarity 6. The magnetic field polarity 6 is switched with an alternating frequency M cycle. Often, measurement data 10 from the period of the same magnetic field polarity 6 is used for a frequency analysis, so that the number of measurement data 10 depends on the switching frequency M-cycle of the magnetic field polarity 6, provided that the sampling rate at which the measuring signal 8 is sampled remains constant. Since the spectral resolution of a frequency spectrum obtained by discrete frequency analysis is equal to the quotient of the measuring signal sampling rate and the number of captured measurement data 10 used for the calculation and the number of captured measurement data 10 in a time window of the same magnetic field polarity 6 depends on the length of the time window, the spectral resolution in the described procedure depends on the alternating frequency M-cycle of the magnetic field polarity 6. This is illustrated in FIG. 2. Four different frequency spectra are shown, which were generated at four different alternating frequencies M-cycle of the magnetic field polarity 6 from the measurement data 10 recorded at a constant sampling rate. It is easy to see that the number of measurement data—more measurement data within a continuous period of constant magnetic field polarity at a lower alternating frequency M-cycle—has a considerable influence on the spectral resolution of the frequency spectra obtained. As higher alternating frequencies M-cycle are often used in practice, it is often not possible to achieve a spectral resolution in the frequency spectrum that leads to meaningful results.

With the method 1 described below for operating a magnetic-inductive flowmeter 2 and with the corresponding magnetic-inductive flowmeter 2, on the one hand the problem of the limited spectral resolution when using measurement data 10 from only one time domain of constant magnetic field polarity 6 can be solved. On the other hand, certain measures make it possible to qualify the events that become recognizable in a frequency spectrum according to whether they are dependent on the direction of the magnetic field 5 (these are often events related to the flow of the medium) or whether they are independent of the magnetic field polarity 6.

FIG. 1 shows an overview of the method 1 and the magnetic-inductive flowmeter 2. A measurement data set 9 with polarized measurement data 10 dependent on the magnetic field polarity 6 from time domains 11 of different magnetic field polarity 6 is generated from the measuring signal 8. A discrete frequency analysis 13 of the measurement data set 9 with polarized measurement data 10 produces a frequency spectrum 14 that is independent of the magnetic field.

A measurement data set 15 with depolarized measurement data 16 is derived from the measurement data set 9 with polarized measurement data 10. Finally, a magnetic field-dependent frequency spectrum 18 is obtained by a discrete frequency analysis 13 of the measurement data set 15 with depolarized measurement data 16.

One advantage of the method 1 is that measurement data 10, 16 from several time domains 11 of constant magnetic field polarity 6 are available and therefore the number of measurement data 10, 16 available for a frequency analysis 13 is not limited and is not necessarily dependent on the alternating frequency M-cycle of the magnetic field polarity 6. A further advantage of the method is that the measurement data set 9 with polarized measurement data 10, which is dependent on the magnetic field polarity 6, and the measurement data set 15 with depolarized measurement data 16 are obtained from the measurement data 10 by appropriate treatment. In the general description section, it has been explained in detail why the treatment of the measurement data 10 results in a magnetic field-independent frequency spectrum 14 being obtained when evaluating the measurement data set 9 with measurement data 10 dependent on the magnetic field polarity 6, from which magnetic field-independent events 22 can be identified, and why a magnetic field-dependent frequency spectrum 18 results from the measurement data set 15 with depolarized measurement data 16, from which magnetic field-dependent events 23 can be identified.

Finally, in an evaluation step 19, the amplitude values 21*a* of the magnetic field-independent frequency spectrum 14 are examined for at least one magnetic field-independent event 22 by peak detection 20 and/or the amplitude values 21*b* of the magnetic field-dependent frequency spectrum 18 are examined for at least one magnetic field-dependent event 23. If a magnetic field-independent event 22 and/or a magnetic field-dependent event 23 is identified, the presence of this event 22, 23 is signaled.

Figure 3A:
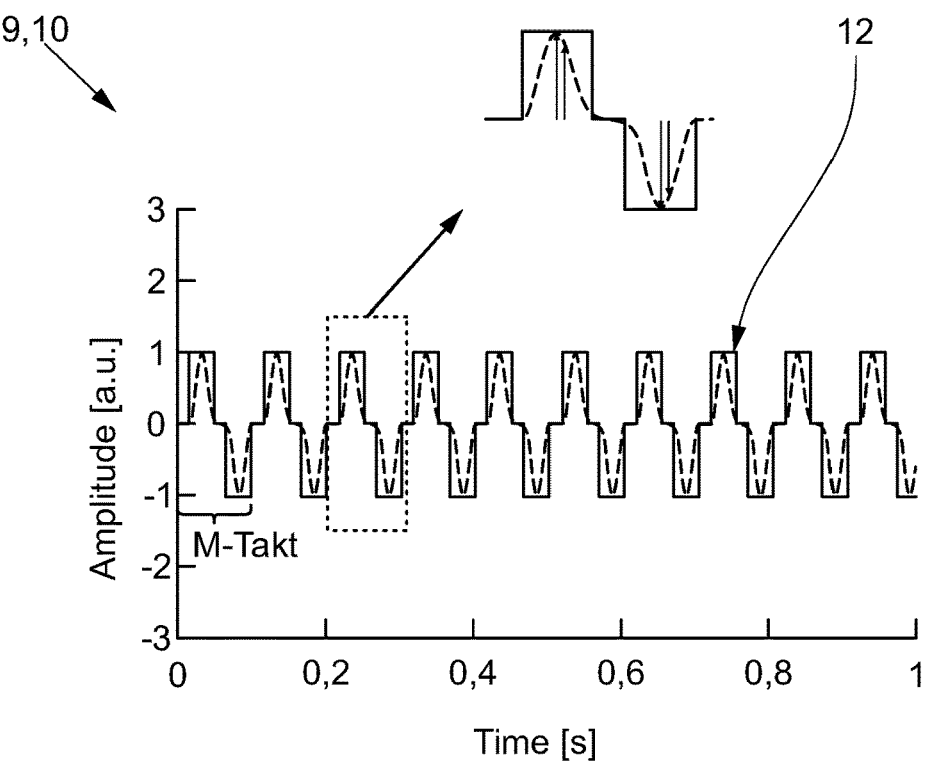
FIG. 3a schematically illustrates the time course of the measurement data set with polarized measurement data of a periodic signal component on the measuring signal with the switching of the magnetic field.
Figure 3B:
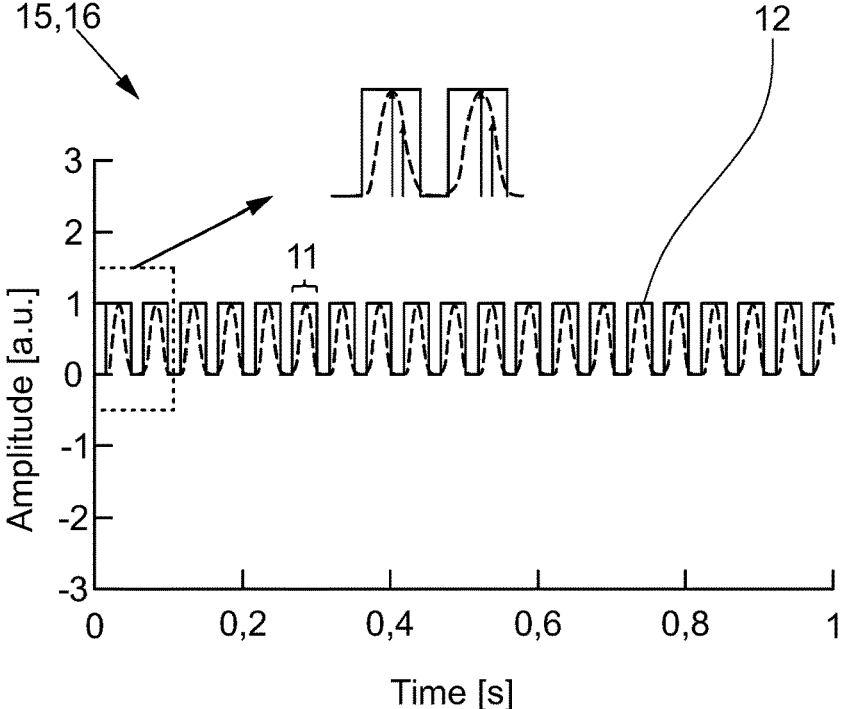
FIG. 3b schematically illustrates the time course of the measurement data set with depolarized measurement data of a periodic signal component on the measuring signal without switching the magnetic field.

FIGS. 3*a* and 3*b* show in greater detail what significance the switching of the magnetic field 5 or the magnetic field polarity 6 with the alternating frequency M-cycle has on the measurement.

FIG. 3*a* shows the case of components in the measuring signal that follow the magnetic field polarity 6. The polarized measurement data 10 changes its sign with the change in magnetic field polarity 6. The solid line shows the course of the measurement windows 12 in which measurement data 10 is recorded, i.e. in which the measuring signal 8 is sampled, which is indicated in the magnified section. The switching of the magnetic field polarity 6 and the corresponding time-limited sampling of the measuring signal 8 in the measuring windows 12 is a windowing of the measuring data 10 with the rectangular signal, which also changes its polarity and describes the measuring windows 12. The frequency spectrum of this windowing has contributions at odd multiples of the alternating frequency M-cycle. These frequencies are found in the event frequencies of the magnetic field-independent events 22 due to the multiplication with the actual measuring signal in the time domain, corresponding to a folding in the frequency domain.

FIG. 3*b* shows the effect of the magnetic field switching with the alternating frequency M-cycle on components of the measuring signal that do not change with the magnetic field polarity 6, i.e. are not dependent on the magnetic field 5. This is a windowing that does not change sign. The frequency spectrum associated with such a windowing has amplitude contributions at even multiples of the alternating frequency M-cycle. Due to the folding of the frequency spectrum of this rectangular function with the magnetic field-independent frequency spectrum 18, the typical frequency spectra of the rectangular function appear at the event frequencies of the magnetic field-dependent frequency spectrum 18.

The implementation of method 1 shown here is characterized in that the measurement data set 9 with polarized measurement data 10 and the measurement data set 15 with depolarized measurement data 16 are processed with a window function to force transitions between the measurement data 10, 16 from the start range and the measurement data 10, 16 from the end range of a measurement data set 9, 15 on which the frequency analyses 13 are based to be as free of discontinuities as possible, wherein a von Hanning window is used in the present case. This window is shown in FIGS. 3a and 3b by the dashed line.

In the method 1 shown here, it is further implemented that a constant component is calculated from the measurement data 10 of the measurement data set 9 with polarized measurement data 10 and the constant component is subtracted from the measurement data 10 of the measurement data set 9 with polarized measurement data. This increases the signal-to-noise ratio, as the alternating components that are actually only of interest remain in the measurement data. The measurement data set 15 with depolarized measurement data 16 is derived from the measurement data set 9 with polarized measurement data 10 after the constant component has been subtracted from the measurement data 10 of the measurement data set 9 with polarized measurement data with the result that the measurement data set 9 with polarized measurement data 10 and the measurement data set 15 with depolarized measurement data 16 are both adjusted for this constant component.

FIG. 3 shows that the measurement windows 12, in which measurement data 10, 16 are actually recorded, do not fill the entire time domain, but only a part of it. This has to do with the fact that after the magnetic field polarity 6 has changed, no measuring data 10 is captured from the measuring signal 8 for a determined time, namely precisely the measuring data that falls within a time domain 11 of a transient magnetic field course, in which the magnetic field in the old magnetic field polarity 6 is decayed and the new magnetic field in the new magnetic field polarity 6 is built up.

Figures 4A, 4B:
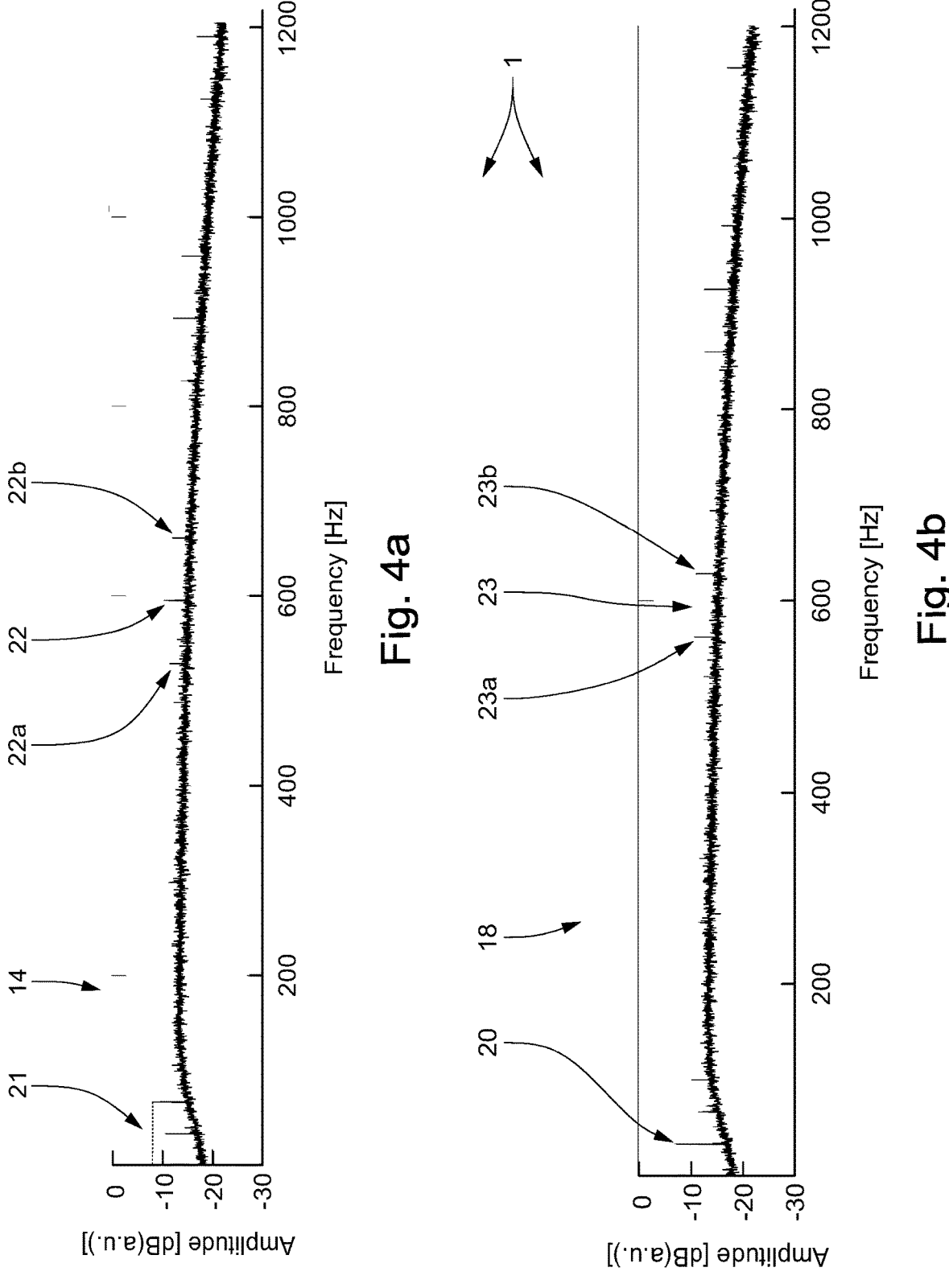
FIG. 4a illustrates a frequency analysis of the measurement data set with polarized measurement data and peak detection.
FIG. 4b illustrates a frequency analysis of the measurement data set with depolarized measurement data and peak detection.

FIGS. 4a and 4b show a magnetic field-independent frequency spectrum 14 (FIG. 4a) and a magnetic field-dependent frequency spectrum 18 (FIG. 4b). In the example shown, an alternating frequency M-cycle of approximately 33 Hz has been used. In FIG. 4a, for example, distinctive amplitudes are recognizable at approximately 528 Hz, 595 Hz and 662 Hz. The recognizable amplitudes at the frequencies of about 528 Hz and 662 Hz are thus spaced apart from the event 22 at about 595 Hz by twice the alternating frequency M-cycle of the magnetic field 5. From this it can be concluded that the event 22 at the frequency 595 Hz is actually a magnetic field-independent event 22. In the present implementation of the method 1, it is therefore implemented that a magnetic field-independent event 22 identified at an event frequency (here 595 Hz) is subjected to a plausibility check in the magnetic field-independent frequency spectrum 14 by checking whether identified or identifiable adjacent events 22a, 22b exist which have a frequency spacing from the event frequency (595 Hz) of the identified magnetic field-independent event 22 of twice the alternating frequency M-cycle of the magnetic field polarity 6. Another magnetic field-independent event can also be recognized at about 890 Hz. Events could also be detected at a different frequency spacing, which is an even multiple of the alternating frequency M-cycle of the magnetic field polarity 6, but the amplitudes decrease sharply with increasing frequency spacing, so that peak detection then becomes very problematic.

In FIG. 4b, two amplitude contributions 23a and 23b are recognizable at twice the frequency spacing of M-cycle, but there is no recognized magnetic field-dependent event 23 here, because there is no amplitude contribution at the point of about 595 Hz, which would then have a single frequency spacing to the events 23a and 23b respectively. This shows that there is no magnetic field-dependent event. If a magnetic field-dependent event 23 were specified, there would be a central event with an amplitude contribution in the magnetic field-dependent frequency spectrum 18 (for example at 595 Hz), but this amplitude contribution would be missing in the magnetic field-independent frequency spectrum 14 at 595 Hz. This means that in the method 1 implemented here, it is also implemented that a magnetic field-dependent event 23 identified at an event frequency is subjected to a plausibility check in the magnetic field-dependent frequency spectrum by checking whether identified or identifiable neighboring events 23a, 23b exist which have a frequency spacing from the event frequency of the identified magnetic field-dependent event 23 of the simple alternating frequency M-cycle of the magnetic field polarity 6.

Figures 5A, 5B:
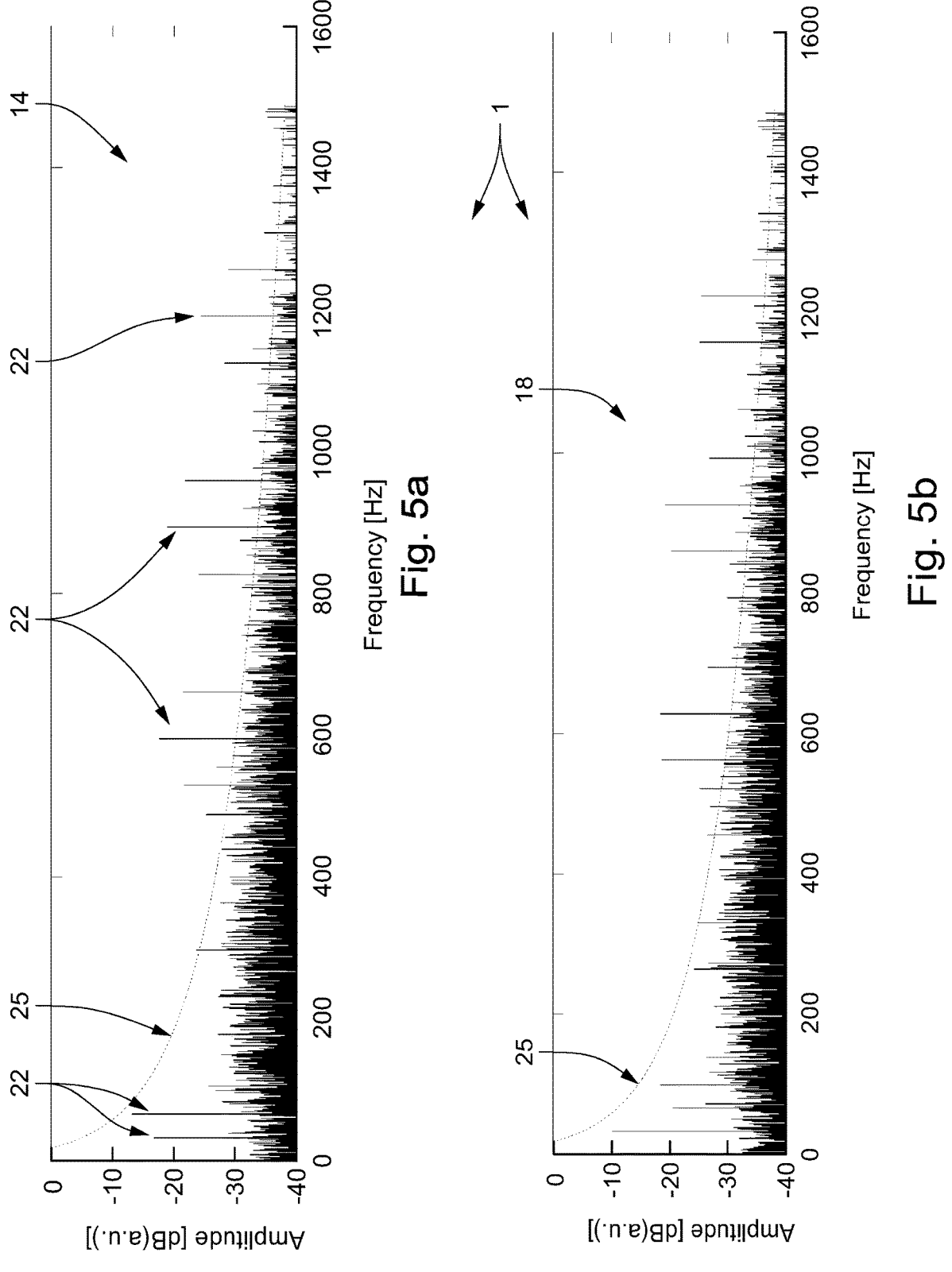
FIG. 5a illustrates a frequency analysis of the measurement data set with polarized measurement data with baseline correction.
FIG. 5b illustrates a frequency analysis of the measurement data set with depolarized measurement data with baseline correction.

In FIGS. 5a and 5b, the frequency spectra in FIGS. 4a and 4b have been subjected to a baseline correction by first generating an averaged frequency spectrum. This is done by averaging a plurality of magnetic field-dependent frequency spectra 18 or by averaging a plurality of magnetic field-independent frequency spectra 14. Preferably, the frequency spectra used for averaging are obtained on the basis of measurement data that originate from only a single time domain of constant magnetic field strength and therefore have a lower spectral resolution due to the lower number of measurement data. This is the method used in the example shown here. The averaged frequency spectrum is subtracted from the magnetic field-dependent frequency spectrum 18 and from the magnetic field-independent frequency spectrum 14 before performing the evaluation step 19. As a result, the remaining amplitudes are normalized to a common baseline and are much easier to recognize as deflections in the frequency spectrum and are also easier to detect by peak detection 20.

In addition, a further refinement of the method is shown in FIG. 5, which is related to the window amplitude values 25 of the frequency spectrum of the window function implemented by the change in magnetic field polarity 6. In this context, in the evaluation step 19, amplitude values of identified events 22, 23 with an event frequency at a multiple of the alternating frequency M-cycle of the magnetic field polarity 6 are compared with window amplitude values 25 of the frequency spectrum of the window function implemented by the change of the magnetic field polarity 6. An identified event 22, in FIG. 5a the two amplitudes on the far left of the diagram, is discarded if its amplitude is smaller than a limit value dependent on the window amplitude value 25 at the event frequency, which in the present case is the window amplitude value 25 itself. This check is based on the consideration that only with amplitude values that are greater than the window amplitude values 25 can it be ensured that the contributions have not been caused exclusively by the window function itself.

The invention claimed is:

1. A method for operating a magnetic-inductive flowmeter with a measuring tube for guiding a medium, with a magnetic field generator for generating a magnetic field of alternating magnetic field polarity passing through the measuring tube perpendicular to the direction of flow of the medium, with a pair of electrodes for tapping an electrical voltage induced in the medium as a measuring signal, wherein measurement data obtained from the measuring signal is transformed from a time domain into a frequency domain and the measuring signal is processed at least into a flow measurement value, the method comprising:

generating from the measuring signal at least one measurement data set with polarized measurement data dependent on the magnetic field polarity from time domains of different magnetic field polarity;

obtaining at least one frequency spectrum independent of the magnetic field by a discrete frequency analysis of the measurement data set with polarized measurement data;

deriving at least one measurement data set with depolarized measurement data from the measurement data set with polarized measurement data;

obtaining at least one magnetic field-dependent frequency spectrum by a discrete frequency analysis of the measurement data set with depolarized measurement data;

in an evaluation step, at least one of: (i) examining amplitude values of the magnetic field-independent frequency spectrum for at least one magnetic field-independent event by peak detection; and (ii) examining amplitude values of the magnetic field-dependent frequency spectrum for at least one magnetic field-dependent event; and signaling the presence of an event when at least one of the magnetic field-independent event and the magnetic field-dependent event is identified.

2. The method according to claim 1, wherein for the derivation of the measurement data set with depolarized measurement data from the measurement data set with polarized measurement data, the measurement data of the measurement data set with polarized measurement data from times of a specific magnetic field polarity are multiplied by −1.

3. The method according to claim 1, wherein at least one constant component is calculated from the measurement data of the measurement data set with polarized measurement data and the constant component is subtracted from the measurement data of the measurement data set with polarized measurement data; and wherein a constant component is calculated for each contiguous time domain of a determined magnetic field polarity and the constant component is subtracted from the measurement data from exactly this contiguous time domain, or a constant component is calculated for several contiguous time domains of a determined magnetic field polarity and the constant component is subtracted from the measurement data from exactly these contiguous time domains.

4. The method according to claim 3, wherein the measurement data set with depolarized measurement data is derived from the measurement data set with polarized measurement data after the constant component has been subtracted from the measurement data of the measurement data set with polarized measurement data, so that the measurement data set with polarized measurement data and the measurement data set with depolarized measurement data are both cleared of a constant component.

5. The method according to claim 1, wherein a specific portion of measurement data is discarded or set to zero after the magnetic field polarity has changed, or no measurement data is captured from the measuring signal for a certain time after the magnetic field polarity has changed;

wherein the measurement data are discarded, are set to zero or are not captured which fall within a time domain of a transient magnetic field course; and wherein the time domain of the transient magnetic field course is deemed to have ended when at least 95% of the final magnetic field strength has been reached.

6. The method according to claim 1, wherein the number of measurement data in the measurement data set with polarized measurement data and thus the number of measurement data in the measurement data set with depolarized measurement data is determined from a desired spectral resolution of the magnetic field-dependent frequency spectrum and the magnetic field-independent frequency spectrum as well as the measuring signal sampling rate, at which the measurement data are obtained from the measuring signal; and wherein the measuring signal sampling rate and an alternating frequency at which the magnetic field polarity is changed are adapted to one another in such a way that the measuring signal sampling rate is an integer multiple of the alternating frequency of the magnetic field polarity.

7. The method according to claim 1, wherein at least one of the measurement data set with polarized measurement data and the measurement data set with depolarized measurement data is provided with a window function for forcing transitions between the measurement data from the start range and the measurement data from the end range of a measurement data set on which the frequency analyses are based; and wherein the von Hanning window or the Blackman window is used as the window function.

8. The method according to claim 1, wherein a magnetic field-independent event identified at an event frequency in the magnetic field-independent frequency spectrum is subjected to a plausibility check by checking whether identified or identifiable adjacent events exist which have a frequency spacing from the event frequency of the identified magnetic field-independent event of twice the alternating frequency of the magnetic field polarity; and wherein in the case of an identified magnetic field-independent event the neighboring events are present symmetrically to the event frequency of the magnetic field-independent event.

9. The method according to claim 1, wherein a magnetic field-dependent event identified at an event frequency in the magnetic field-dependent frequency spectrum is subjected to a plausibility check by checking whether identified or identifiable adjacent events exist, which have a frequency spacing from the event frequency of the identified magnetic field-dependent event of the simple alternating frequency of the magnetic field polarity; and wherein in the case of an identified magnetic field-dependent event the neighboring events are present symmetrically to the event frequency of the magnetic field-dependent event.

10. The method according to claim 1, wherein an averaged frequency spectrum is calculated by at least one of averaging a plurality of magnetic field-dependent frequency spectra and averaging a plurality of magnetic field-independent frequency spectra, and the averaged frequency spectrum is subtracted from at least one of the magnetic field-dependent frequency spectrum and the magnetic field-independent frequency spectrum before performing the evaluation step.

11. The method according to claim 1, wherein, in the evaluation step, amplitude values of identified events having an event frequency at a multiple of the alternating frequency of the magnetic field polarity are compared with window amplitude values of the frequency spectrum of the window function implemented by the alternation of the magnetic field polarity;

wherein an identified event is discarded if its amplitude is smaller than a limit value dependent on the window amplitude value at the event frequency; and wherein the limit value is the window amplitude value itself.

12. A magnetic-inductive flowmeter, comprising:

a measuring tube for guiding a medium;

a magnetic field generator for generating a magnetic field of alternating magnetic field polarity passing through the measuring tube perpendicular to the direction of flow of the medium;

a pair of electrodes for tapping an electrical voltage induced in the medium as a measuring signal;

wherein a signal processing device obtains measurement data from the measuring signal, the signal processing device transforms the measurement data from a time domain into a frequency domain;

wherein the signal processing device processes the measuring signal into a flow measurement value;

wherein the signal processing device in an operating state of the magnetic-inductive flowmeter generates from the measuring signal at least one set of measurement data with polarized measurement data dependent on the magnetic field polarity from time domains of different magnetic field polarity;

wherein the signal processing device obtains at least one frequency spectrum independent of the magnetic field by a discrete frequency analysis of the measurement data set with polarized measurement data;

wherein the signal processing device derives at least one measurement data set with depolarized measurement data from the measurement data set with polarized measurement data;

wherein the signal processing device obtains at least one magnetic field-dependent frequency spectrum by a discrete frequency analysis of the measurement data set with depolarized measurement data;

wherein, in an evaluation step, the signal processing device at least one of: (i) examines amplitude values of the magnetic field-independent frequency spectrum for at least one magnetic field-independent event by peak detection; and (ii) examines amplitude values of the magnetic field-dependent frequency spectrum for at least one magnetic field-dependent event; and wherein upon identification of at least one of a magnetic field-independent event and a magnetic field-dependent event, the signal processing device signals the presence of the event.

13. The magnetic-inductive flowmeter according to claim 12, wherein a corresponding flag is set in the memory to signal the identified event or that a corresponding signal is shown on a display of the magnetic-inductive flowmeter or that a corresponding message is sent via a communication interface.

14. The magnetic-inductive flowmeter according to claim 12, wherein the signal processing device is designed in such a way that at least one of:

for the derivation of the measurement data set with depolarized measurement data from the measurement data set with polarized measurement data, the measure-
ment data of the measurement data set with polarized measurement data from times of a specific magnetic field polarity are multiplied by −1;

at least one constant component is calculated from the measurement data of the measurement data set with polarized measurement data and the constant component is subtracted from the measurement data of the measurement data set with polarized measurement data, and a constant component is calculated for each contiguous time domain of a determined magnetic field polarity and the constant component is subtracted from the measurement data from exactly this contiguous time domain, or a constant component is calculated for several contiguous time domains of a determined magnetic field polarity and the constant component is subtracted from the measurement data from exactly these contiguous time domains;

the measurement data set with depolarized measurement data is derived from the measurement data set with polarized measurement data after the constant component has been subtracted from the measurement data of the measurement data set with polarized measurement data, so that the measurement data set with polarized measurement data and the measurement data set with depolarized measurement data are both cleared of a constant component;

a specific portion of measurement data is discarded or set to zero after the magnetic field polarity has changed, or no measurement data is captured from the measuring signal for a certain time after the magnetic field polarity has changed, the measurement data are discarded, are set to zero or are not captured which fall within a time domain of a transient magnetic field course, and the time domain of the transient magnetic field course is deemed to have ended when at least 95% of the final magnetic field strength has been reached;

the number of measurement data in the measurement data set with polarized measurement data and thus the number of measurement data in the measurement data set with depolarized measurement data is determined from a desired spectral resolution of the magnetic field-dependent frequency spectrum and the magnetic field-independent frequency spectrum as well as the measuring signal sampling rate, at which the measurement data are obtained from the measuring signal, and the measuring signal sampling rate and an alternating frequency at which the magnetic field polarity is changed are adapted to one another in such a way that the measuring signal sampling rate is an integer multiple of the alternating frequency of the magnetic field polarity;

at least one of the measurement data set with polarized measurement data and the measurement data set with depolarized measurement data is provided with a window function for forcing transitions between the measurement data from the start range and the measurement data from the end range of a measurement data set on which the frequency analyses are based, and the von Hanning window or the Blackman window is preferably used as the window function;

a magnetic field-independent event identified at an event frequency in the magnetic field-independent frequency spectrum is subjected to a plausibility check by checking whether identified or identifiable adjacent events exist which have a frequency spacing from the event frequency of the identified magnetic field-independent event of twice the alternating frequency of the magnetic field polarity, and in the case of an identified magnetic field-independent event the neighboring events are present symmetrically to the event frequency of the magnetic field-independent event;

a magnetic field-dependent event identified at an event frequency in the magnetic field-dependent frequency spectrum is subjected to a plausibility check by checking whether identified or identifiable adjacent events exist, which have a frequency spacing from the event frequency of the identified magnetic field-dependent event of the simple alternating frequency of the magnetic field polarity, and in the case of an identified magnetic field-dependent event the neighboring events are present symmetrically to the event frequency of the magnetic field-dependent event;

an averaged frequency spectrum is calculated by at least one of averaging a plurality of magnetic field-dependent frequency spectra and averaging a plurality of magnetic field-independent frequency spectra, and the averaged frequency spectrum is subtracted from at least one of the magnetic field-dependent frequency spectrum and the magnetic field-independent frequency spectrum before performing the evaluation step; and in the evaluation step, amplitude values of identified events having an event frequency at a multiple of the alternating frequency of the magnetic field polarity are compared with window amplitude values of the frequency spectrum of the window function implemented by the alternation of the magnetic field polarity, and an identified event is discarded if its amplitude is smaller than a limit value dependent on the window amplitude value at the event frequency, and the limit value is the window amplitude value itself.

* * * * *